Patented Dec. 27, 1949

2,492,458

UNITED STATES PATENT OFFICE 2,492,458

FIBRIN FOAM

Edgar A. Bering, Jr., Brookline, Mass., assignor to the United States of America as represented by the Secretary of the Navy No Drawing. Application December 8, 1944, Serial No. 567,322

8 Claims. (Cl. 167—74)

This invention relates to fibrin clots having a porous structure of low density and to methods for preparing the same. The fibrin clots may be conveniently referred to as fibrin foam.

A main object of the invention is the production of a hemostatic agent for use in elective surgery to control bleeding of all kinds, for instance from oozing surfaces such as cut bone surfaces, dura mater, muscle, or to control freely bleeding surfaces such as a lacerated venous sinus, torn veins, tumor beds, and the like. As a first aid hemostatic agent, the foams may be used primarily as dressing for lacerations.

A serious drawback of many widely used hemostatic techniques, for instance pressure application of sponges and pledgets saturated with saline solution, or thrombin or other clotting agents, lies in the fact that the materials used in such techniques must eventually be separated and removed from the oozing or bleeding surface. In so separating and removing the materials, the clot which has been formed is usually pulled away so that hemostasis is lost, and often the technique must be repeated. Fibrin foam of this invention, in contrast to usual hemostatic agents, has the marked advantage that it can be left permanently in a wound and therefore its use avoids the disturbances which necessarily accompany separation and removal. The foam is eventually absorbed by the human body.

While fibrin clots derived from blood plasma, including fibrin sheets, filaments, tubes, blocks and the like, are described in copending applications of John D. Ferry and Peter R. Morrison, the present invention provides a fibrin clot in the form of a foam, admirably suited for hemostatic purposes. Its low density porous absorbent structure permits the clot to absorb greater volumes of tissue fluids than a solid clot and to soak up greater volumes of blood. It can also soak up a large volume of a clotting agent such as thrombin solution, which is then available for hemostasis when applied to a bleeding area. Its flexible, doughy and resilient nature, when moistened, also permits it to be worked into suitable shaped pieces and to conform to irregular surfaces to which it is applied.

While the properties of fibrin foam of this invention may be varied as hereinafter described, according to the proportion of ingredients and the technique of preparation, a present preferred density for a dry foam is an average of 0.032 gram per cc.

Furthermore, in one form of the invention, the dry foam contains an excess of a clotting agent, such as purified thrombin, which is available for hemostasis.

Fibrin foams of this invention may be prepared from fractions of human blood plasma obtained in accordance with methods described in copending applications of Edwin J. Cohn. Purified fibrinogen fractions of the plasma may be converted into fibrinogen solutions of desirable properties for use in the preparation of fibrin foams, by methods set forth in the previously mentioned Ferry et al. applications.

As an example of such preparation of a suitable fibrinogen solution, the following is given:

The corpuscles are first removed from the blood by centrifugation, clotting of the fibrinogen being prevented by the addition of citrates or like agents. The plasma remaining after the separation of the corpuscles may then be treated for the precipitation therefrom of fibrinogen by cooling the same to 0° C. to —3° C. and adding thereto an organic precipitant, for example an alcohol such as ethanol. Ethanol may be added in amounts sufficient to constitute 8 to 10 per cent by volume of the plasma. The hydrogen ion concentration and the ionic strength of the plasma are also preferably adjusted. The pH of the solution may be controlled by the addition of acids or alkalis and the ionic strength by the addition of a salt, for example sodium chloride, ammonium sulfate, sodium sulfate, sodium, ammonium, or potassium phosphate, acetate, carbonate, citrate, or the like. Phosphates, carbonates, or citrates are particularly suitable salts because they have a buffer action and thus control both the ionic strength and the hydrogen ion concentration. For the precipitation of fibrinogen the pH may initially be adjusted in the neighborhood of 6.0 to 7.8. An ionic strength of 0.05 is adequate for effecting electrical discharge and flocculation; higher ionic strengths (e. g. 0.15 or more) are sometimes desirable for buffering.

The moist precipitate thus secured contains approximately 20 per cent protein of which 45 to 65 per cent is fibrinogen.

While it is possible to dissolve the moist precipitate in a solution of sodium citrate and then to freeze and dry from the frozen state to produce a stable powder which can be stored and afterwards redissolved, for the purposes of this invention a fibrinogen solution may be prepared directly from the moist precipitate and immediately processed into foams of this invention. For this purpose the moist precipitate is taken up in a citrate buffer of pH 6.05±0.05 and ionic strength of 0.27 to produce a solution containing approximately 1.3 per cent fibrinogen and having a pH of 6.2±0.2 and an ionic strength of 0.28. This may be accomplished by utilizing about 5 liters of buffer of the above given pH and ionic strength plus 2.5 liters of 0.15 molar sodium chloride solution per kilogram of precipitate and filtering the resulting turbid solution (with added diatomaceous earth) through filter paper and then through washed filter pads.

Similar solutions may be prepared from fibrinogen precipitates which have been frozen for storage, breaking them up before or after thawing and mixing with the citrate buffer as described in connection with the moist precipitate, followed by similar filtration.

Regardless of how the fibrinogen solution is prepared, it should be used within a few hours after preparation. Such a solution may be beaten to a foam with a high speed mechanical stirrer or it can be similarly aerated by forcing the solution through a Seitz type filter pad with gas under pressure. The fibrinogen solution should increase to about 2.3 times its original volume during foaming. For example, 375 cc. of fibrinogen solution may be thus foamed in a 1200 cc. Waring Blender bowl in about 45 seconds, though the time will vary with different types of mixers.

After the agitation has produced the desired increased volume, a clotting agent is added, and agitation continued until clotting occurs. For this purpose, thrombin prepared by the method of Cohn and Edsall or by other procedures known to those skilled in the art, may be used.

In producing one type of fibrin foam of our invention, the purified thrombin used may be one containing 30 units per cc. and not more than 0.75 per cent solids. The unit referred to is defined as that amount of thrombin which will clot 1 cc. of 1 per cent fibrinogen solution at pH 7 and ionic strength of 0.3 at 25° C. in 15 seconds.

Seven cc. of such thrombin solution is added to the foam per 100 cc. of initial fibrinogen solution and beating is continued until clotting occurs, a matter of 18 to 25 seconds where 30 units per cc. are used. If a longer clotting time is desired (45 seconds), the thrombic activity of the clotting agent may be reduced to 15 units per cc.

The material is then cut into pieces of suitable size, frozen, and dried from the frozen state to produce an amorphous, stable material with a dull, rough surface and characterized by the presence of discrete macroscopic and microscopic pores. This material will wet easily with water and almost instantaneously with ethanol. On wetting, the final product shrinks slightly, the amount of shrinkage depending upon the conditions of preparation.

The foam may be dried in other manners, for instance, by cutting the material into pieces of suitable size and carrying them through a series of 95 per cent alcohol baths until the water has been replaced by ethanol; this takes about 48 to 72 hours. The material may then be dried in air at 0° C. or less, the resulting material being similar to that dried from the frozen state.

A third method of drying is without freezing, in which case the resulting product appears to be made of small bubbles of thin, brittle, glistening, translucent fibrin membrane. The outer surface is glazed and smooth without any apparent break and the material wets very slowly. Its characteristics do not adapt it for as satisfactory use as a hemostatic agent as the material dried from the frozen state.

After drying by any of these methods, the foam may be sterilized by dry heat, for instance at 170° C. for 90 to 100 minutes. Such sterilization will, however, destroy any thrombin present. It will also change the mechanical properties and the ease of wetting of the foam somewhat.

Foams dried from the frozen state or with ethanol are particularly desirable for use as hemostatic agents. Hemostasis may be effected by soaking the sterile dry fibrin foam in a saline thrombin solution and applying a piece of the thrombin-soaked foam to the freshly sponged bleeding point or wound. The fibrin foam is then held in place with gentle pressure preferably exerted through cotton or gauze. Excess moisture should be removed; by suction if available. When clotting has taken place (about one minute) the pressure may be removed and the fibrin foam left in situ. The foam is eventually absorbed.

Instead of preparing a sterilized thrombin-free foam as above described, it is possible to prepare a dry fibrin foam containing an excess of thrombin so that addition of thrombin at the time of application is unnecessary.

One method of preparing such an excess thrombin-containing foam is to prepare a sterile dry fibrin foam as above described, and then add thereto a sterile thrombin solution (either aqueous or ethanol) and then freeze the thrombin-containing foam and dry from the frozen state, the addition of the thrombin being made with aseptic technique.

A second method of preparing such an excess thrombin-containing dry fibrin foam is to omit the sterilization step and prepare the fibrin clot with aseptic technique throughout, adding excess sterile thrombin at the time of clotting. As will be understood, sterile solutions of both fibrinogen and thrombin may be obtained by suitable filtration.

In the preparation of excess thrombin-containing foams, thrombin solutions containing, for example, 500 (instead of 15 to 30) units per cc. and not more than 8 per cent solids, is added to the mixture at the time of clotting.

As in the case of the previously described type of foam, about 10 cc. of this more active thrombin solution may be added per 100 cc. of fibrinogen solution, but the rate of addition should preferably be not slower than 10 cc. in 4 seconds and beating should preferably stop within 4 seconds after the thrombin has been added.

The foam is then frozen and dried from the frozen state in the same manner as previously described. If the foam is not frozen immediately, it may lyse in a short time.

A typical dried fibrin foam-thrombin material as previously described may contain about 35 per cent fibrin (as calculated from the original solution) and not more than 40 per cent by weight of thrombin solution proteins. The latter content should impart sufficient thrombic activity so that the average clotting time of five pieces, each 5 mg. in weight, cubic in shape, each in 1 cc. of standard fibrinogen (1% solution) will be 50 seconds or less.

Preferably the moisture content is less than 1%.

Such excess thrombin-containing foams may be applied in hemostasis without the addition of further thrombin merely by moistening the foam with water or saline solution.

As previously indicated, the properties of the end product may be varied by variation of the constitutents of the starting solution and of the technique of preparation.

By varying the fibrinogen concentration of the solution from which the foam is made, the density and the wetting and shrinking properties of the foam may be varied. Increasing the concentration of fibrinogen results in a heavy, firm foam; while foams made from 0.5% to 1% fibrinogen concentrations are light and fluffy. The upper limit is dependent upon the solubility of the fibrinogen and the higher concentrations (2%+) form dried foams which wet more slowly and shrink less than foams made from the weaker concentrations of fibrinogen (less than 1%). The denser foams tend to retract away from tissue and do not adhere as well as the lighter foams.

Foams made at low pH, 6.0-6.3, tend to synerize before drying, while foams made as high pH, 7.0-7.7, do not show this tendency. On the other hand, structures made at pH 6 exhibit greater mechanical strength than those made at pH 7.

The amount of thrombin used to clot the foams will also affect the strength of the final product. If an amount of thrombin just sufficient to clot the foam is used, mechanical strength is high. As the concentration of the added thrombin solution is increased, the strength of the clot decreases.

The final product may also be altered by addition of a plasticizer. Small amounts of glycerol (1 to 10% of the protein content) in the original solution give a final foam which is very flexible and elastic.

Treatment of the final product with protein denaturants (Formalin, potassium dichromate, Zenker's solution) gives the product a quality of resiliency which allows it to return to its original form. As thus treated, the material remains water-absorbent and will stand rewetting and drying many times without change.

Therapeutic agents, for example, penicillin, sulfa drugs, etc., may be added to or incorporated in the fibrin foam.

It will be understood that while the above described fibrin foams have been described in connection with their use as hemostatic agents, they have other fields of usefulness, as for example in food products.

In the above description and accompanying claims, the word "porous" is used to denote a structure characterized by the presence of discrete macroscopic and microscopic pores.

I claim:
1. A sterile self-supporting dry porous aerated fibrin-fibrin-thrombin clot produced by clotting fibrinogen in foamy condition with thrombin and containing sufficient thrombin solution proteins for imparting sufficient thrombic activity so that the clotting time of specimens 5 mg. in weight, cubic in shape and in 1 cc. of one per cent standard solution of fibrinogen is not substantially longer than fifty seconds.

2. As a hemostatic agent, a sterile dry porous water-absorbent aerated fibrin foam-thrombin clot produced by clotting fibrinogen while in foamy condition with thrombin, the said clot containing approximately 35 per cent fibrin and not more than 40 per cent thrombin solution proteins.

3. A method for forming a porous fibrin clot of low density which comprises as steps precipitating fibrinogen from blood, thus obtaining a product in which the fibrinogen is associated with a lesser amount of other protein than that with which it is normally associated in the blood, preparing a fibrinogen solution therefrom, aerating said solution to form a foam, and converting the fibrinogen of the foam into fibrin and forming a porous clot by adding a clotting agent to said foam.

4. A method for forming a porous fibrin clot of low density which comprises as steps precipitating fibrinogen from blood, redissolving said fibrinogen to form a solution containing not less than 0.5 per cent fibrinogen, beating said solution to form a foam, and clotting said foam by adding thrombin thereto.

5. A method for forming a porous fibrin clot of low density which comprises as steps preparing a fibrinogen solution, beating the solution to form a foam and converting the fibrinogen of the foam to fibrin by adding a clotting agent thereto while the fibrinogen is in foamed condition.

6. A method for forming a porous fibrin clot of low density containing excess thrombin comprising preparing a fibrinogen solution, aerating the solution to form a foam, clotting the fibrinogen of said foam by adding thereto a thrombin solution having a thrombic activity in excess of that necessary to clot the fibrinogen of said foam and drying the clotted foam.

7. A method for forming a sterile porous fibrin clot of low density comprising preparing a fibrinogen solution, aerating the solution to form a foam, converting the fibrinogen of the foam to fibrin by adding an excess of clotting agent to said foam, drying the clotted fibrin and sterilizing the clot.

8. A method for forming a sterile porous fibrin slot of low density containing excess thrombin which comprises preparing a fibrinogen solution, aerating the solution to form a foam, clotting the fibrinogen of the foam by adding thereto a thrombin solution, drying the clotted foam to form a dry porous clot, sterilizing the porous clot, saturating the sterilized clot with a sterile solution of thrombin, freezing the saturated clot and drying the frozen clot from its frozen state.

EDGAR A. BERING, Jr.

REFERENCES CITED

The following references are of record in the file of this patent:

UNITED STATES PATENTS

| Number | Name | Date |
| --- | --- | --- |
| 650,003 | Bremer | May 22, 1900 |
| 1,513,949 | Wescott | Nov. 4, 1924 |
| 1,593,814 | Vogel | July 27, 1926 |
| 2,160,503 | Herrmann | May 30, 1939 |
| 2,369,111 | Parfenjev | Feb. 6, 1945 |
| 2,385,802 | Ferry | Oct. 2, 1945 |
| 2,385,803 | Cohn et al. | Oct. 2, 1945 |

OTHER REFERENCES

Grey: Surgery, Gynecology and Obstetrics, vol. XXI (1915), pages 452–454.

Cohn: "Blood, Blood Derivatives and Blood Substitutes," pages 159 to 173, inclusive. Copy in Division 55.

Cohn et al.: J. Am. Chem. Soc., December 1940, pages 3396 to 3400. Copy in Division 55.